US009292201B2

(12) United States Patent
Joo

(10) Patent No.: US 9,292,201 B2
(45) Date of Patent: Mar. 22, 2016

(54) METHOD AND APPARATUS FOR CONTROLLING A DISPLAY IN A PORTABLE TERMINAL

(71) Applicant: Samsung Electronics Co., Ltd, Gyeonggi-do (KR)

(72) Inventor: Sang-Woo Joo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 193 days.

(21) Appl. No.: 13/706,285

(22) Filed: Dec. 5, 2012

(65) Prior Publication Data

US 2013/0145311 A1 Jun. 6, 2013

(30) Foreign Application Priority Data

Dec. 5, 2011 (KR) .................. 10-2011-0128974

(51) Int. Cl.
G06F 3/0488 (2013.01)
G06F 3/0487 (2013.01)
G06F 1/16 (2006.01)
G06F 3/01 (2006.01)
G06F 3/041 (2006.01)

(52) U.S. Cl.
CPC .......... G06F 3/04886 (2013.01); G06F 1/1652 (2013.01); G06F 3/017 (2013.01); G06F 3/0414 (2013.01); G06F 3/0487 (2013.01)

(58) Field of Classification Search
None
See application file for complete search history.

(56) References Cited

U.S. PATENT DOCUMENTS

| | | | | |
|---|---|---|---|---|
| 8,502,788 | B2* | 8/2013 | Cho | 345/173 |
| 8,543,166 | B2* | 9/2013 | Choi et al. | 455/566 |
| 2004/0008191 | A1 | 1/2004 | Poupyrev et al. | |
| 2004/0212588 | A1 | 10/2004 | Moriyama | |
| 2005/0146498 | A1 | 7/2005 | Hemia et al. | |
| 2006/0274036 | A1* | 12/2006 | Hioki et al. | 345/156 |
| 2010/0011291 | A1 | 1/2010 | Nurmi | |
| 2010/0060548 | A1* | 3/2010 | Choi et al. | 345/1.3 |
| 2010/0117975 | A1* | 5/2010 | Cho | 345/173 |
| 2010/0120470 | A1* | 5/2010 | Kim et al. | 455/566 |
| 2010/0164888 | A1* | 7/2010 | Okumura et al. | 345/173 |
| 2010/0182265 | A1* | 7/2010 | Kim et al. | 345/173 |
| 2011/0210922 | A1* | 9/2011 | Griffin | 345/173 |
| 2012/0115422 | A1* | 5/2012 | Tziortzis et al. | 455/73 |
| 2012/0235894 | A1* | 9/2012 | Phillips | 345/156 |

* cited by examiner

*Primary Examiner* — Matt Kim
*Assistant Examiner* — Mahelet Shiberou

(57) ABSTRACT

A method and apparatus configured to control a display in a portable terminal includes sensing that the flexible display is bent, dividing the flexible display into a main screen and a sub screen, and outputting first information through the main screen and outputting second information through the sub screen.

20 Claims, 9 Drawing Sheets

METHOD AND APPARATUS FOR CONTROLLING A DISPLAY IN A PORTABLE TERMINAL

CROSS-REFERENCE TO RELATED APPLICATION(S) AND CLAIM OF PRIORITY

The present application is related to and claims priority under 35 U.S.C. §119(a) to a Korean Patent Application filed in the Korean Intellectual Property Office on Dec. 5, 2011 and assigned Serial No. 10-2011-0128974, the contents of which are herein incorporated by reference.

TECHNICAL FIELD OF THE INVENTION

The present invention generally relates computing devices, and more particularly, to a method and apparatus for controlling a display in a portable terminal.

BACKGROUND OF THE INVENTION

Owing to the development of the electronic communication industry, portable terminals are becoming a necessity to modern society while becoming a significant means of delivery of rapidly changing information.

Recently, with the development and popularization of Graphical User Interface (GUI) systems, portable terminals have grown to a point that they may incorporate a flexible display. The flexible display can be bent, so it is playing a leading role in a conventionally restrictive display field. For example, the flexible display is being widely used in a field of an electronic book replacing a publication such as a magazine and a field of a new portable Information Telecommunication (IT) product such as a subminiature Personal Computer (PC) whose display can be folded or rolled for carriage, a smart card making real-time information confirmation possible, and the like.

However, as the portable terminal gets smaller to enhance mobility and carriage, while its performance increases, there is a limitation in displaying these contents to a screen. For instance, though a menu is not often used, when the menu is displayed on a screen, actually, the portable terminal displays contents desired by a user in a relatively small scale.

SUMMARY OF THE INVENTION

To address the above-discussed deficiencies of the prior art, it is a primary object to provide at least the advantages below. Accordingly, one aspect of the present invention is to provide a control method and apparatus for, when a flexible display is bent, changing the contents of a screen in a portable terminal.

Another aspect of the present invention is to provide a control method and apparatus for, when a flexible display is bent, dividing the flexible display into a main screen and a sub screen, and outputting information through the main screen and the sub screen in a portable terminal.

A further aspect of the present invention is to provide a control method and apparatus for, when a flexible display is bent, dividing the flexible display into a main screen and a sub screen, controlling the main screen according to control information designated to the sub screen, and outputting information through the main screen in a portable terminal.

The above aspects are achieved by providing a method and apparatus for controlling a display in a portable terminal.

According to one aspect of the present invention, a method for controlling a flexible display in a portable terminal includes sensing that the flexible display is bent, dividing the flexible display into a main screen and a sub screen, and outputting first information through the main screen and outputting second information through the sub screen.

According to another aspect of the present invention, an apparatus for controlling a display in a portable terminal includes a flexible display, a storage unit, and a controller. The flexible display is configured to output information. The storage unit is configured to store data about an operation of the portable terminal. The controller is configured to sense that the flexible display is bent, divides the flexible display into a main screen and a sub screen, and output first information through the main screen and outputs second information through the sub screen.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged display devices. Preferred embodiments of the present invention will be described herein below with reference to the accompanying drawings. In the following description, well-known functions or constructions are not described in detail since they would obscure the invention in unnecessary detail. And, terms described below, which are defined considering functions in the present invention, can be different depending on user and operator's intention or practice. Therefore, the terms should be defined on the basis of the disclosure throughout this specification.

A control method and apparatus for, when a flexible display is bent, changing the contents of a screen in a portable terminal according to the present invention are described below. According to an example embodiment of the present invention, when the flexible display is bent, the portable terminal divides the flexible display into a main screen and a sub screen, and outputs information through the main screen and the sub screen. Further, according to an example embodiment of the present invention, when the flexible display is bent, the portable terminal divides the flexible display into the main screen and the sub screen, controls the main screen according to control information designated to the sub screen, and outputs information through the main screen.

Figure 1:
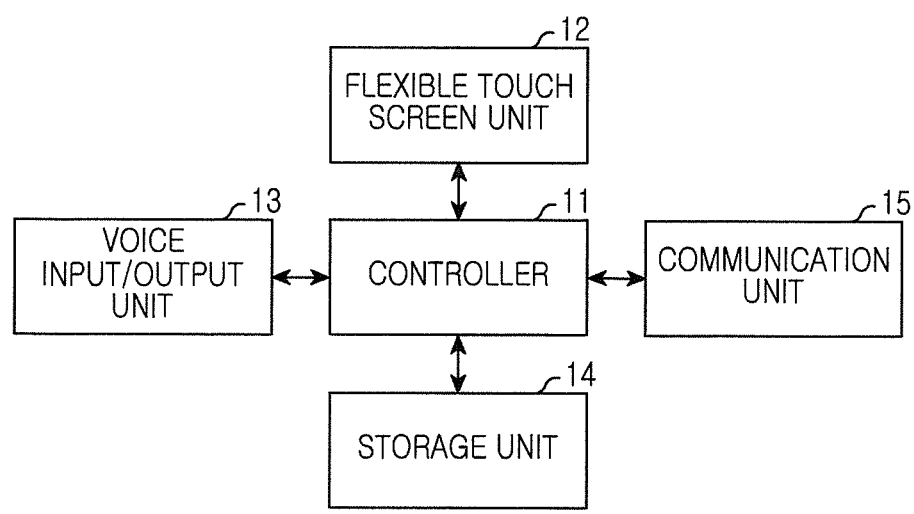
FIG. 1 illustrates an example portable terminal according to one embodiment of the present invention.

FIG. 1 illustrates an example portable terminal according to an example embodiment of the present invention.

Referring to FIG. 1, the portable terminal includes a controller 11, a flexible touch screen unit 12, a voice input/output unit 13, a storage unit 14, and a communication unit 15.

The controller 11 sets an execution environment of the portable terminal, holds information thereof, and makes data input/output exchange for all elements of the portable terminal. Further, the controller 11 can perform a corresponding communication service function through the communication unit 15. Also, the controller 11 can include a Coder/DECoder (CODEC) for converting a video signal and a voice signal through the flexible touch screen unit 12 and the voice input/output unit 13.

The flexible touch screen unit 12 represents a touch based flexible display. The flexible touch screen unit 12 displays, as a video, a signal received from the controller 11 and outputs a signal generated by user touch, to the controller 11.

The voice input/output unit 13 outputs, as sound, a signal received from the controller 11 and outputs a voice signal to the controller 11.

The storage unit 14 stores data associated with operation of the portable terminal. The controller 11 loads information from the storage unit 14 and performs an operation according to the present invention.

The communication unit 15 performs communication. Through the communication unit 15, the controller 11 performs a corresponding communication service.

Particularly, the controller 11 senses that the flexible touch screen unit 12 is bent. Also, the controller 11 can distinguish a bent region of the flexible touch screen unit 12 from a non-bent region. According to bending or non-bending of the flexible touch screen unit 12, the controller 11 changes the contents of a screen. A control method of the controller 11 according to the present invention is described below with reference to the drawings.

Figure 2:
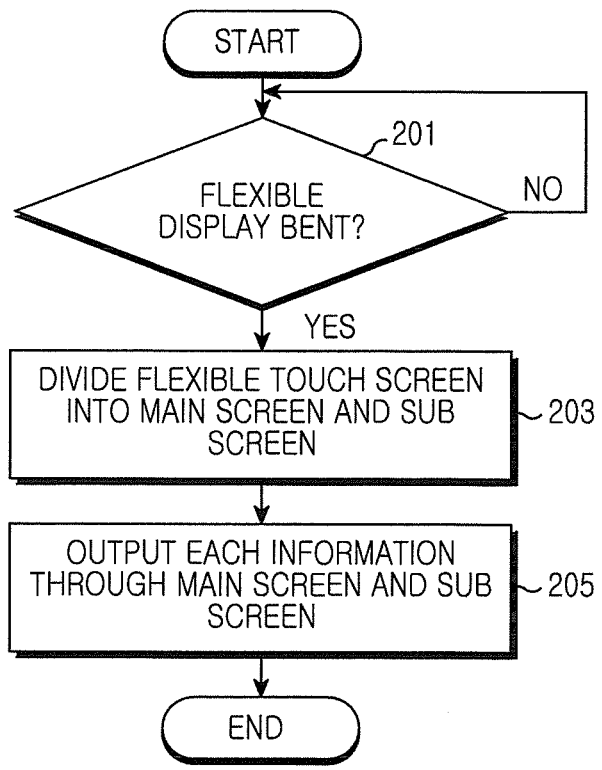
FIG. 2 illustrates an example procedure of controlling a flexible display in a portable terminal according to one embodiment of the present invention.

FIG. 2 illustrates an example procedure of controlling a flexible display in a portable terminal according to an example embodiment of the present invention.

Figure 3A:
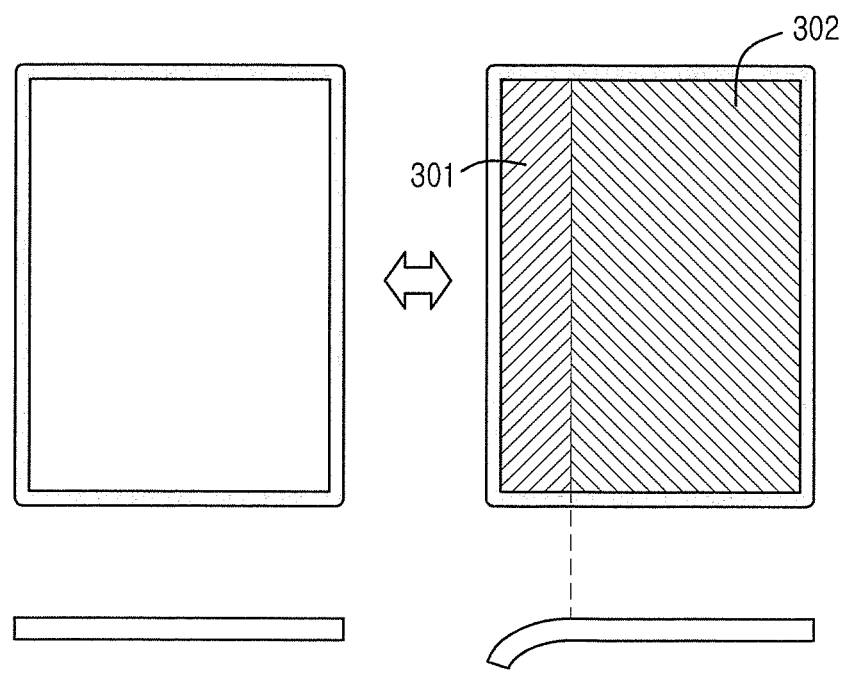
FIGS. 3A and 3B illustrates an example main screen and sub screen of a flexible display according to one embodiment of the present invention.
Figure 3B:
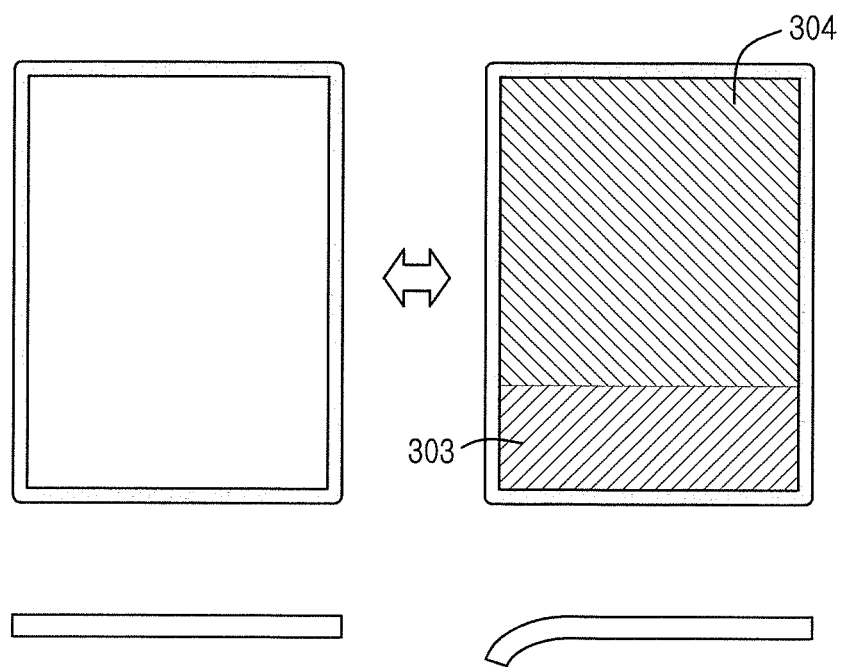

Referring to FIG. 2, in step 201, the controller 11 senses that a flexible display is bent. Then, the controller 11 proceeds to step 203 and divides the flexible display into a main screen and a sub screen. FIGS. 3A and 3B illustrate a main screen and sub screen of a flexible display according to an example embodiment of the present invention. Referring to FIG. 3A, the controller 11 allots the sub screen as a bent region 301 of the flexible display and allots the main screen as the remnant region 302 thereof. Therefore, when the bent region 301 of the flexible display is changed, the controller 11 also changes the sub screen allotted as the bent region 301. Referring to FIG. 3B, irrespective of bending of the flexible display, the controller 11 allots the sub screen as a preset first region 303, and allots the main screen as a preset second region 304. Further, this does not intend to limit the scope and spirit of the invention and accordingly, the controller 11 may decide the whole screen of the flexible display as the main screen and determine an overlaid screen, which is overlaid on the main screen, as the sub screen.

Next, in step 205, the controller 11 outputs first information through the main screen, and outputs second information through the sub screen. The controller 11 can output the second information associated with the first information of the main screen through the sub screen.

After that, when the flexible display is unbent, the controller 11 releases the main screen and the sub screen, and outputs only the first information through the whole screen of the flexible display or outputs an integration of the first information and the second information.

FIGS. 4 through 8 illustrate example user interface screens of a flexible touch screen according to one embodiment of the present invention.

Figure 4:
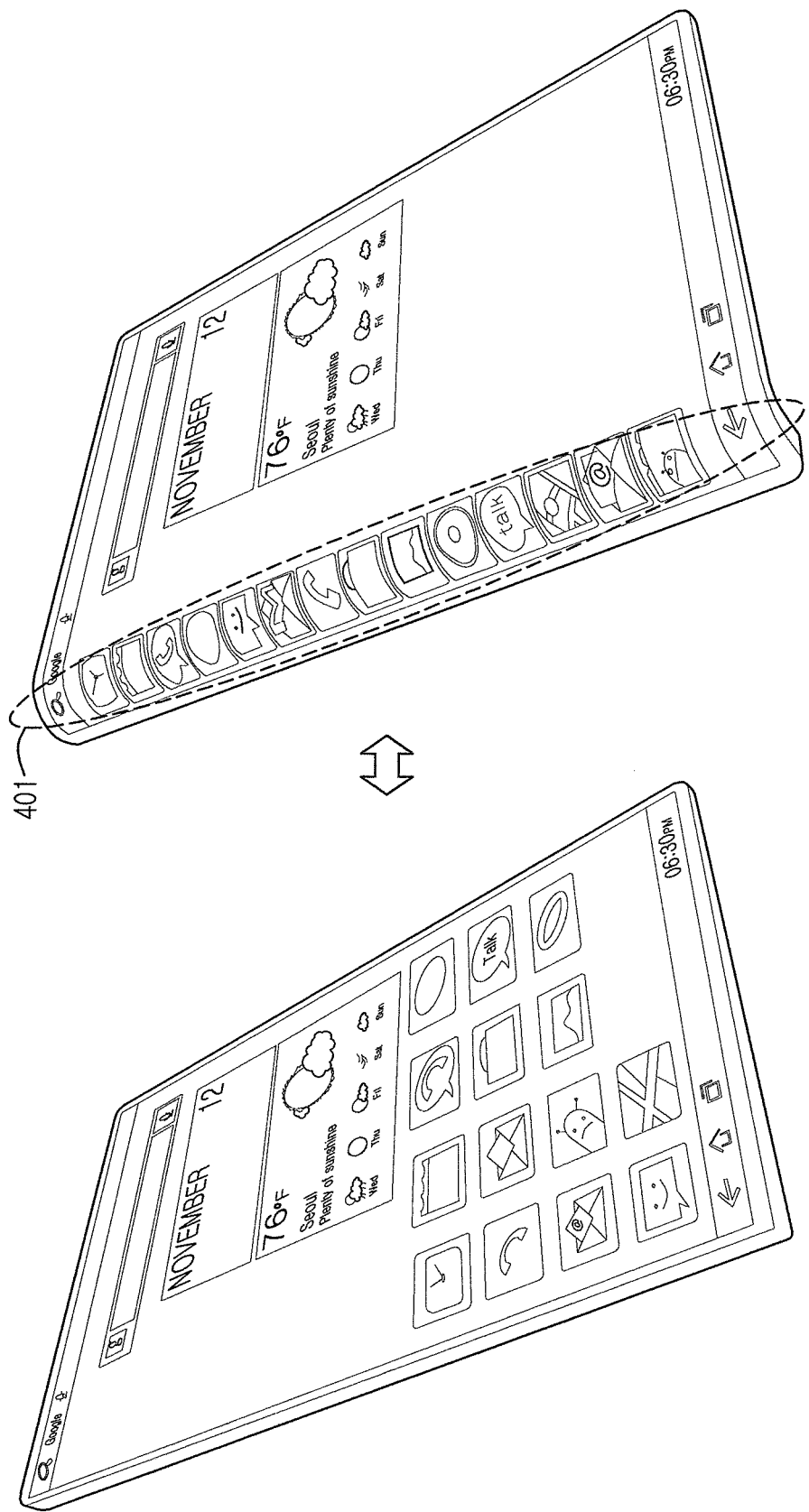
FIGS. 4 to 8 illustrate example user interface screens of a flexible touch screen according to one embodiment of the present invention.

Referring to FIG. 4, when a flexible touch screen displaying icons is bent, the controller 11 outputs the icons to a sub screen 401 and outputs contents void of the icons to a main screen.

Figure 5:
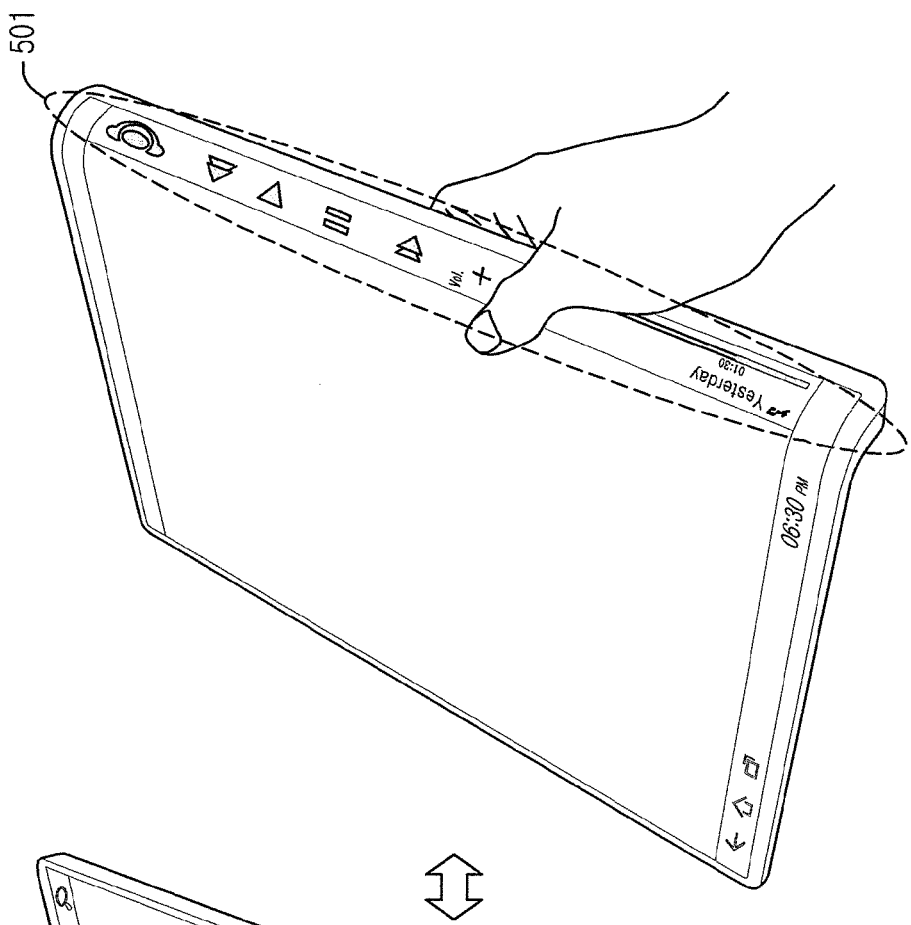
Figure 5:
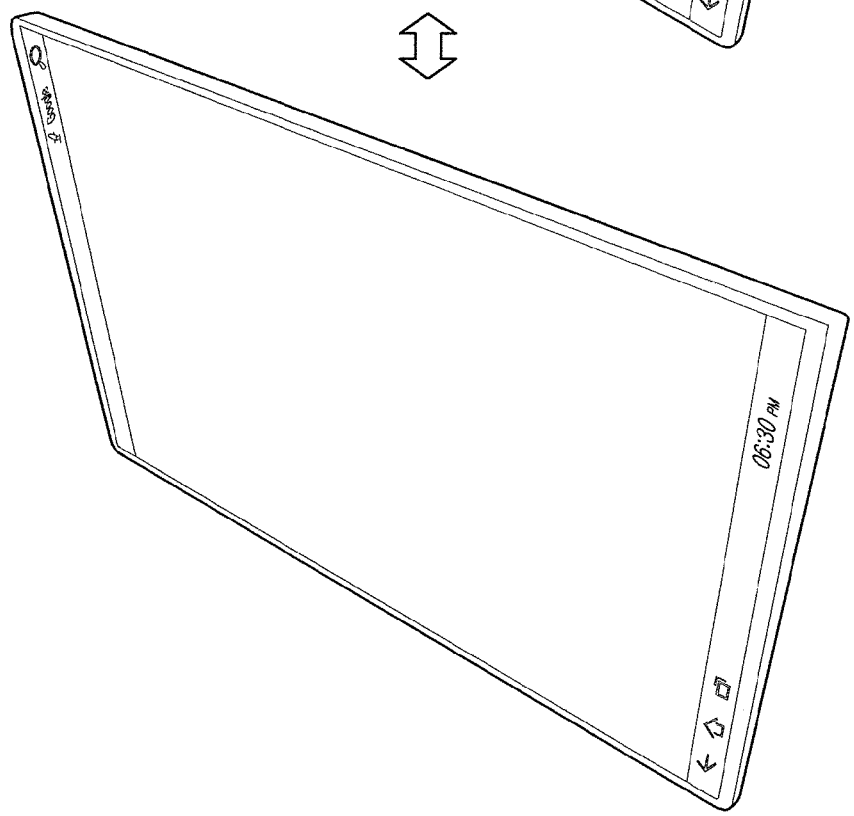

Referring to FIG. 5, when a flexible touch screen displaying the output of a corresponding program as a background is bent, the controller 11 loads information associated with the program operating as the background from the storage unit 14 and, through a sub screen 501, outputs the loaded information.

Figure 6:
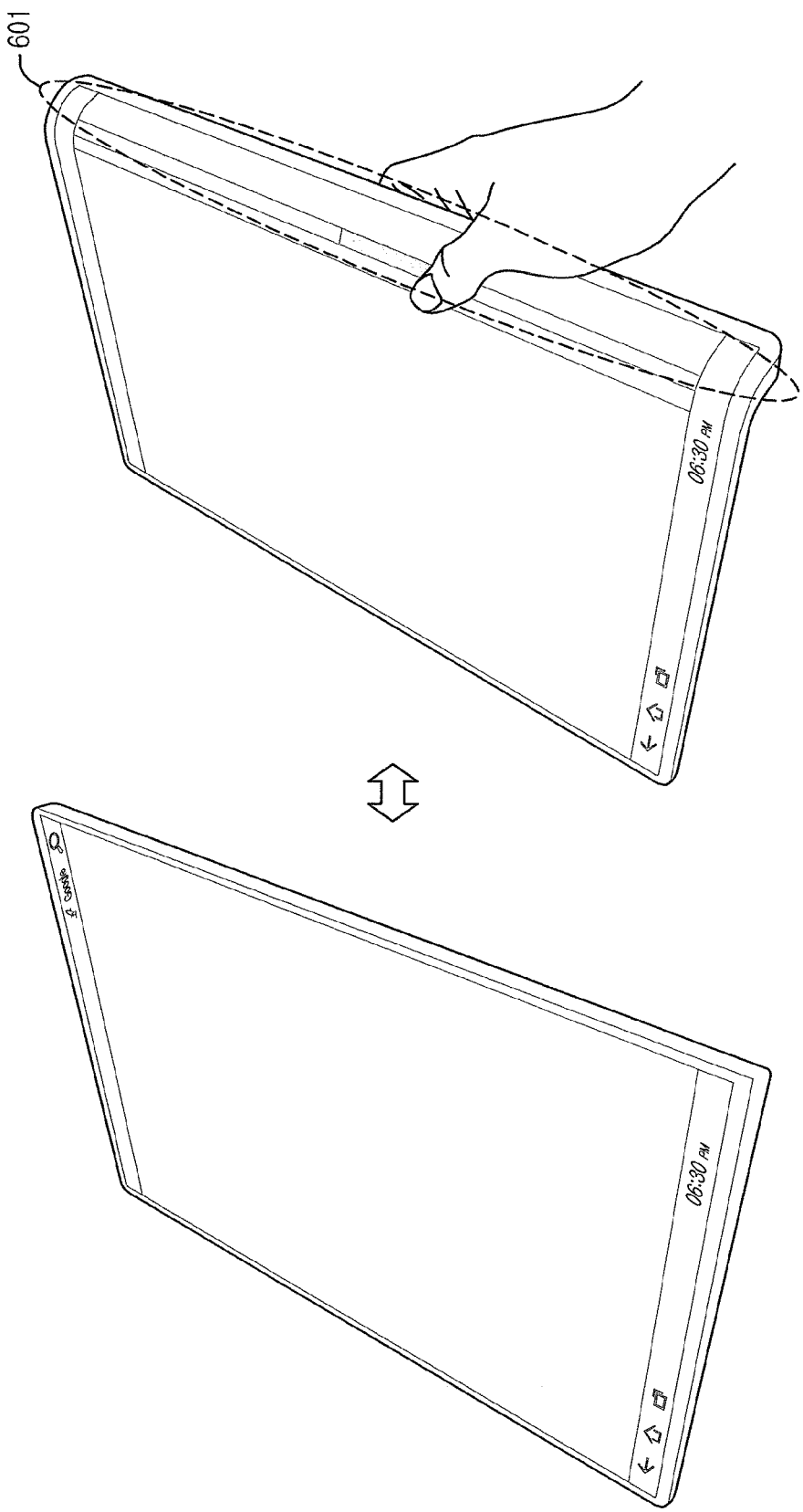

Referring to FIG. 6, when a flexible touch screen displaying a contents page is bent, the controller 11 outputs the contents page to a main screen and, through a sub screen 601, outputs a menu for a user to scroll the contents page.

Figure 7:
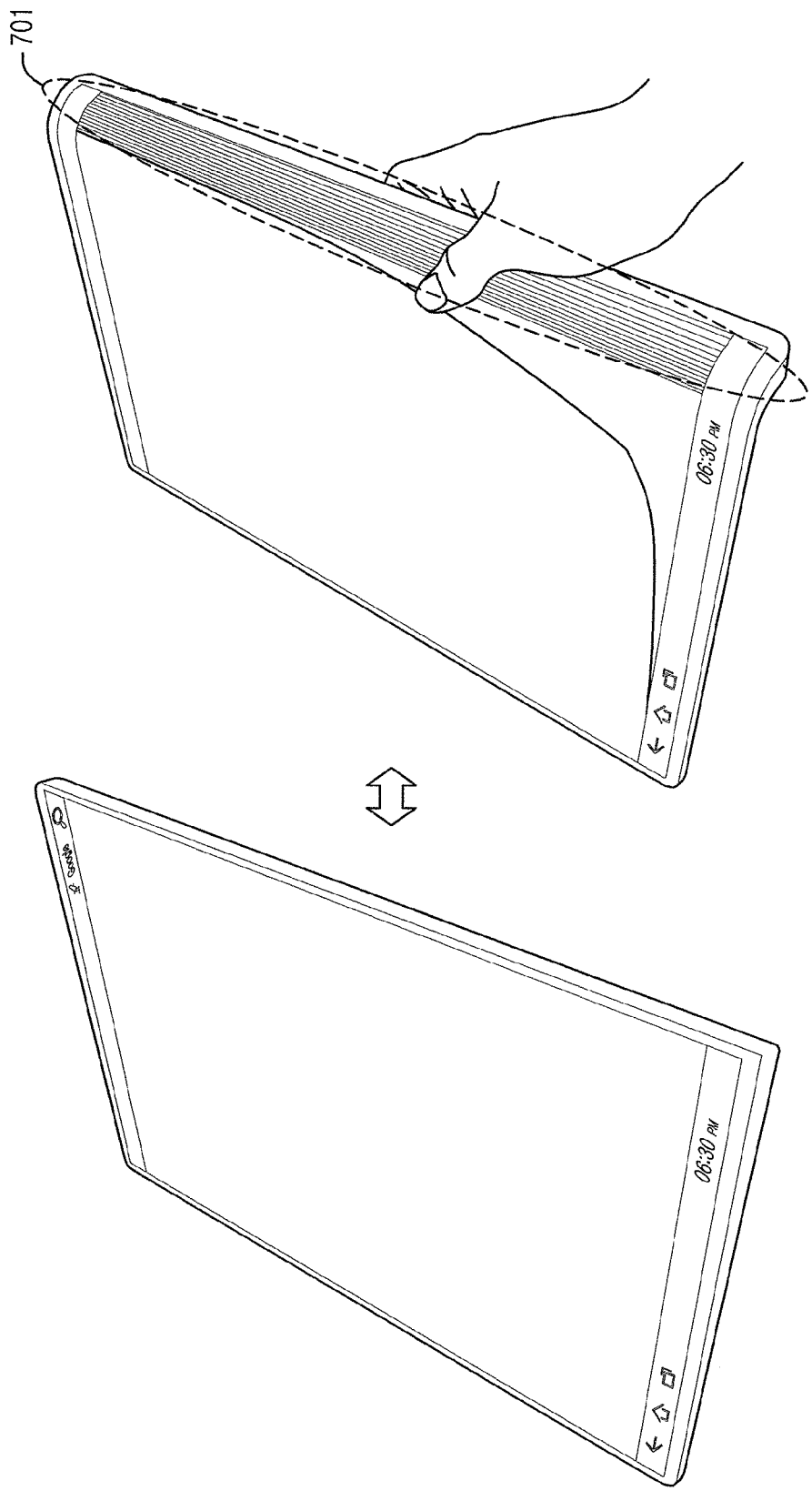

Referring to FIG. 7, when a flexible touch screen displaying a contents page is bent, the controller 11 outputs the contents page to a main screen and, through a sub screen 701, outputs a menu for a user to turn the contents page to a previous page or a next page.

Figure 8:
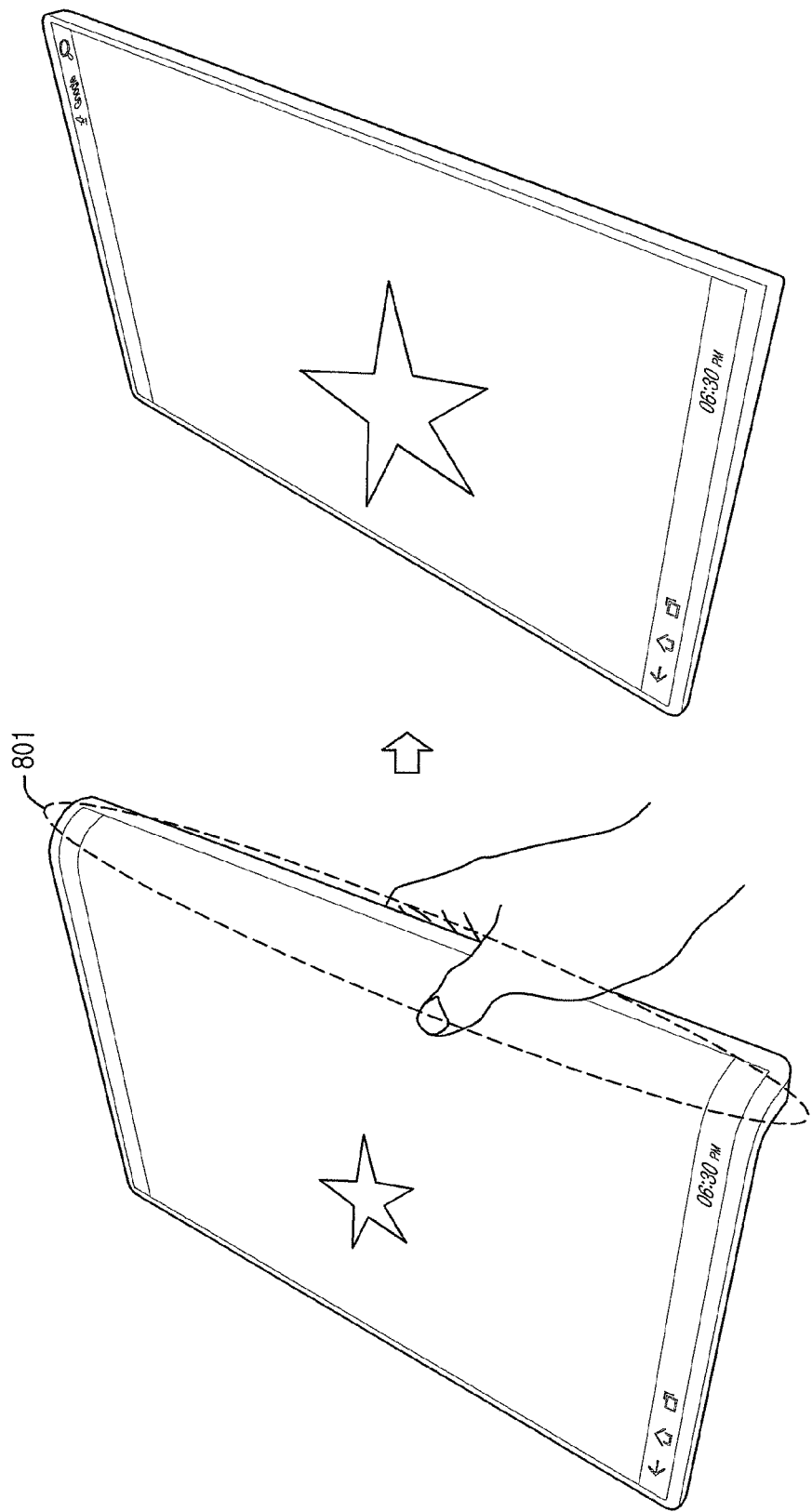

Referring to FIG. 8, when a flexible touch screen displaying a contents page is bent, the controller 11 outputs the contents page to a main screen and, through a sub screen 801, outputs a menu for a user to zoom in or out the contents page.

Further, when the controller 11 confirms control information, which is designated to a sub screen, from the storage unit 14, the controller 11 can control a main screen according to the control information, and output first information through the main screen. For instance, when the control information is a control of scrolling the contents of the main screen, the controller 11 scrolls the contents of the main screen and outputs first information. Also, when the control information is a control of turning a displayed page of the main screen, the controller 11 turns the displayed page of the main screen to a previous or next page. Further, when the control information is a control of zooming in or out the contents of the main screen, the controller 11 zooms in or out and outputs the contents of the main screen.

As described above, certain embodiments of the present invention has an advantage of, when a flexible display is bent, changing the contents of a screen, thus leading to a user's satisfaction at a user interface side.

It will be appreciated that embodiments of the present invention according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, embodiments provide a program comprising code for implementing apparatus or a method as claimed in any one of the claims of this specification and a machine-readable storage storing such a program While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for controlling a flexible display in a portable terminal, the method comprising:
    displaying a screen in a view area on a surface of the flexible display;
    identifying that the flexible display is bent;
    dividing the view area into a main screen area and a sub screen area on a basis of a bent region, wherein the sub screen area includes the bent region; and
    outputting first information in the main screen area and second information in the sub screen area on the surface of the flexible display, wherein the first information is related to the second information.

2. The method of claim 1, further comprising:
    when the flexible display is unbent, releasing the main screen area and the sub screen area and, through a whole screen of the flexible display, outputting only the first information or outputting an integration of the first information and the second information.

3. The method of claim 1, further comprising:
    when control information is designated to the sub screen area, controlling the main screen area according to the control information, and outputting the first information in the main screen area.

4. The method of claim 3, wherein the control information comprises any one of information associated with control of scrolling displayed contents of the main screen area to a corresponding direction, information associated with control of zooming in or out displayed contents of the main screen area, and information associated with control of turning displayed contents of the main screen area to previous displayed contents or next displayed contents.

5. The method of claim 1, wherein dividing the view area into the main screen area and the sub screen area on the basis of the bent region comprises:
    distinguishing a non-bent region and the bent region; and
    allotting the main screen area to include the non-bent region, and allotting the sub screen area to include the bent region.

6. The method of claim 1, further comprising:
    distinguishing a non-bent region and the bent region; and
    changing the sub screen area as the bent region changes.

7. The method of claim 1, wherein dividing the view area into the main screen area and the sub screen area on the basis of the bent region comprises:
    allotting the main screen area to include a preset first region; and
    allotting the sub screen area to include a preset second region.

8. The method of claim 1, wherein dividing the view area into the main screen area and the sub screen area on the basis of the bent region comprises:
    determining that a whole screen of the flexible display is to include the main screen area;
    further constructing an overlaid screen on the main screen area; and
    determining the overlaid screen to include the sub screen area.

9. The method of claim 1, wherein outputting the first information in the main screen area and outputting the second information in the sub screen area comprises outputting the second information through in the sub screen area when the second information associated with the first information exists.

10. The method of claim 1, wherein outputting the first information in the main screen area and outputting the second information in the sub screen area comprises outputting the second information to the sub screen area when a program operated as a background is confirmed and the second information about the program operated as the background exists.

11. An apparatus configured to control a display in a portable terminal, the apparatus comprising:
    a flexible display configured to output information and display a screen in a view area on a surface of the flexible display;
    a storage unit configured to store data about an operation of the portable terminal; and
    a controller configured to:
        identify that the flexible display is bent,
        divide the view area into a main screen area and a sub screen area on a basis of a bent region, wherein the sub screen area includes the bent region, and
        output first information in the main screen area and second information in the sub screen area on the surface of the flexible display, wherein the first information is related to the second information.

12. The apparatus of claim 11, wherein, when the flexible display is unbent, the controller is configured to release the main screen area and the sub screen area and, through a whole screen of the flexible display, output only the first information or output an integration of the first information and the second information.

13. The apparatus of claim 11, wherein, when control information is designated to the sub screen area, the controller is configured to control the main screen area according to the control information, and output the first information in the main screen area.

14. The apparatus of claim 13, wherein the control information comprises any one of information associated with control of scrolling displayed contents of the main screen area to a corresponding direction, information associated with control of zooming in or out displayed contents of the main screen area, and information associated with control of turning displayed contents of the main screen area to previous displayed contents or next displayed contents.

15. The apparatus of claim 11, wherein the controller is configured to distinguish a non-bent region and the bent region, and allot the main screen area as the non-bent region and allot the sub screen area as the bent region.

16. The apparatus of claim 11, wherein the controller is configured to distinguish a non-bent region and the bent region and change the sub screen area as the bent region is changed.

17. The apparatus of claim 11, wherein the controller is configured to allot the main screen area as a preset first region, and allot the sub screen area as a preset second region.

18. The apparatus of claim 11, wherein the controller is configured to decide a whole screen of the flexible display as the main screen area, construct an overlaid screen on the main screen area, and determine the overlaid screen to be the sub screen area.

19. The apparatus of claim 11, wherein the controller is configured to output the second information in the sub screen area when the second information associated with the first information exits.

20. The apparatus of claim 11, wherein the controller is configured to output the second information to the sub screen area when a program operated as a background is confirmed and the second information about the program operated as the background exits.

\* \* \* \* \*